(12) United States Patent
Coleman

(10) Patent No.: US 7,272,977 B2
(45) Date of Patent: Sep. 25, 2007

(54) DUAL GAUGE

(75) Inventor: Nathan L. Coleman, Parsons, TN (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/095,025

(22) Filed: Mar. 31, 2005

(65) Prior Publication Data

US 2006/0107748 A1 May 25, 2006

Related U.S. Application Data

(60) Provisional application No. 60/557,999, filed on Mar. 31, 2004.

(51) Int. Cl.
*G01F 13/02* (2006.01)
(52) U.S. Cl. .................................................. 73/736
(58) Field of Classification Search .................. 73/37, 73/736
See application file for complete search history.

(56) References Cited

U.S. PATENT DOCUMENTS 4,380,166 A * 4/1983 Crombie ...................... 73/1.69
5,388,444 A * 2/1995 Gerard ............................ 73/37

* cited by examiner

*Primary Examiner*—Jewel Thompson
(74) *Attorney, Agent, or Firm*—Michael P. Leary; Charles E. Yocum; Adan Ayala

(57) ABSTRACT

A dual gauge assembly. In an exemplary embodiment, the dual gauge assembly includes a housing. Further, a display face is disposed within the housing for displaying a pressure range. In addition, an indicating device is disposed within the housing for indicating pressure for at least two different pressure sources. Moreover, at least two ports are coupled to the housing for pneumatically coupling the at least two different pressure sources to the indicator assembly. The indicating device provides a visual indication of the at least two different pressure sources within the single housing.

13 Claims, 3 Drawing Sheets

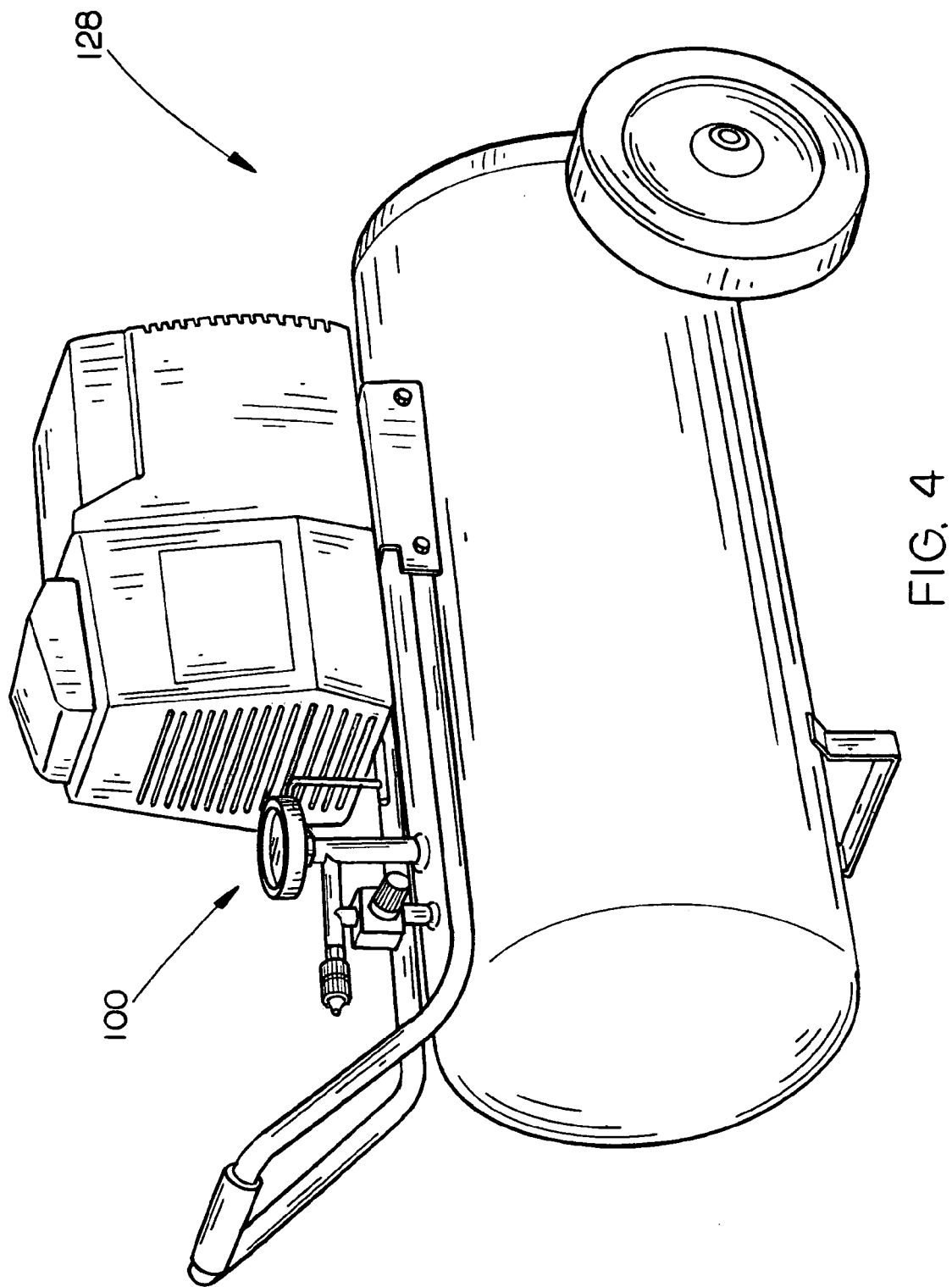

DUAL GAUGE

CROSS-REFERENCE TO RELATED CASES

The present application claims the benefit under 35 U.S.C. § 119(e) of U.S. Provisional Application Ser. No. 60/557,999, filed Mar. 31, 2004 which is herein incorporated by reference in its entirety.

FIELD OF INVENTION

The present invention generally relates to the field of pneumatics, and particularly to a dual gauge.

BACKGROUND OF THE INVENTION

Pneumatic devices usually operate optimally in a specified range. For example, a fastener may operate at approximately 90 psi (ninety pounds per square inch). In order to accommodate several devices (such as several nailers) or to accommodate a device which consumes a large quantity of air (such as a blow gun), a pneumatic compressor usually includes a reservoir which is pressurized to a higher pressure than is demanded by the device (e.g., 135 psi, one hundred and thirty-five pounds per square inch). This arrangement allows for a greater amount of useful or effective air. The higher pressure allows for a greater quantity of air to be stored before the reservoir must be replenished (i.e., the compressor pump required to recharge the reservoir).

While the air in the tank is maintained at a first pressure, an outlet or pneumatic line connected to a pneumatic device usually is operated at a second pressure to ensure proper operation of the device. For example, a pneumatic nailer may experience wear if too high a pressure is utilized, in contrast, a fastener may not be driven to a correct depth if too low a pressure is utilized. Therefore, it is desirable to be able to provide air at two different pressures. Further, it is desirable for a user to be able to monitor the different pressures to help ensure that the desired pressures are maintained.

Conventional pneumatic compressors have addressed the aforementioned need by employing a plurality of air pressure gauges each disposed within distinct individual housings. For instance, a pneumatic compressor may include one gauge for indicating the tank pressure and another for indicating the regulated outlet pressure. Although the plurality of gauges allows a user to monitor the air pressure of the different components, such configuration is limited for a number of reasons. First, the plurality of gauges are each disposed within distinct individual housings. Such configuration not only increases the cost of manufacturing the pneumatic compressor, but also the size of the manifold assembly and the complexity of operating such compressor. Further, a user must observe each of the gauges to determine the respective pressures.

Therefore, it would be desirable to provide a user the ability to monitor multiple pressures by observing a single assembly.

SUMMARY OF INVENTION

Accordingly, the present invention is directed to a dual gauge assembly. The present invention allows for dual pressure indication within a single compact, cost efficient housing. Those of skill in the art will appreciate that while a pneumatic compressor is discussed in detail the principles of the present invention may be utilized on any pneumatic device where multiple pressures are to be monitored. Further, a dual gauge assembly in accordance with the present invention may be utilized in non-pneumatic devices where multiple pressures are to be monitored such as in compressed gas welding, or the like.

In accordance with a first aspect of the present invention, a dual gauge assembly including a housing is disclosed. In an exemplary embodiment, the dual gauge assembly includes a display face disposed within the housing for displaying a pressure range. Further, an indicating device is disposed within the housing for indicating pressure for at least two different pressure sources. In addition, at least two ports are coupled to the housing for pneumatically coupling the at least two different pressure sources to the indicator assembly. The indicating device provides a visual indication of the at least two different pressure sources within the housing.

In accordance with an additional aspect of the present invention, a dual gauge assembly including a single housing coupled to a first port and a second port is disclosed. In an exemplary embodiment, the first port is pneumatically coupled to a first pressure source and a second port is pneumatically coupled to a second pressure source. Further, a display face is disposed within the single housing for displaying a first range and a second range. The first range corresponds to the first pressure source and the second range corresponds to the second pressure source. Additionally, a first indicator may be disposed within the single housing operable for providing a visual indication of the pressure of material disposed within the first pressure source. Moreover, a second indicator may be disposed within the single housing operable for providing a visual indication of the pressure of material disposed within the second pressure source. The first and second indicators provide a visual indication of the pressure of the material disposed within the first pressure source and the pressure of the material within the second pressure source within the single housing.

In accordance with a further aspect of the present invention, the first and second ports are coaxial. Further, in exemplary embodiments, the first indicator indicates the pressure of material disposed within a tank and the second indicator indicates the pressure of material disposed within a regulated outlet. Additionally, an O-ring may be included, within the dual gauge assembly, for pneumatically isolating the first port from the second port. Moreover, the first port and second port may be disposed within a threaded shaft included within the housing.

In accordance with further aspects of the present invention, an air compressor including a dual gauge assembly is provided. In an exemplary embodiment, the air compressor includes a pump for pressurizing air. Further, a tank which stores pressurized air is coupled to the pump. Additionally, a dual gauge assembly is pneumatically coupled with the tank and a regulated outlet for providing a visual indication of a first pressure of air disposed within the tank and a second pressure of air disposed within the regulated outlet. The dual gauge assembly includes a housing for encompassing the dual gauge assembly. The housing is coupled to a first port and a second port. Moreover, a display face is disposed within the housing for visually displaying the first pressure of material disposed within the tank and the second pressure of material disposed within the regulated outlet. In addition, a first indicator is disposed within the single housing for providing an indication of the pressure of material disposed within the first pressure source. A second indicator is disposed within the single housing for providing a visual indication of the pressure of material disposed within the second pressure source. The first and second indicators of the dual gauge assembly provide a simultaneous visual indication of the first pressure of the material disposed within the tank and the second pressure of the material disposed within the regulated outlet.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 4 is an isometric illustration of a dual gauge assembly in accordance with the present invention, wherein the dual gauge assembly is operationally coupled to an air compressor assembly.

DETAILED DESCRIPTION OF THE INVENTION

Reference will now be made in detail to the presently preferred embodiments of the invention, examples of which are illustrated in the accompanying drawings.

Figure 1:
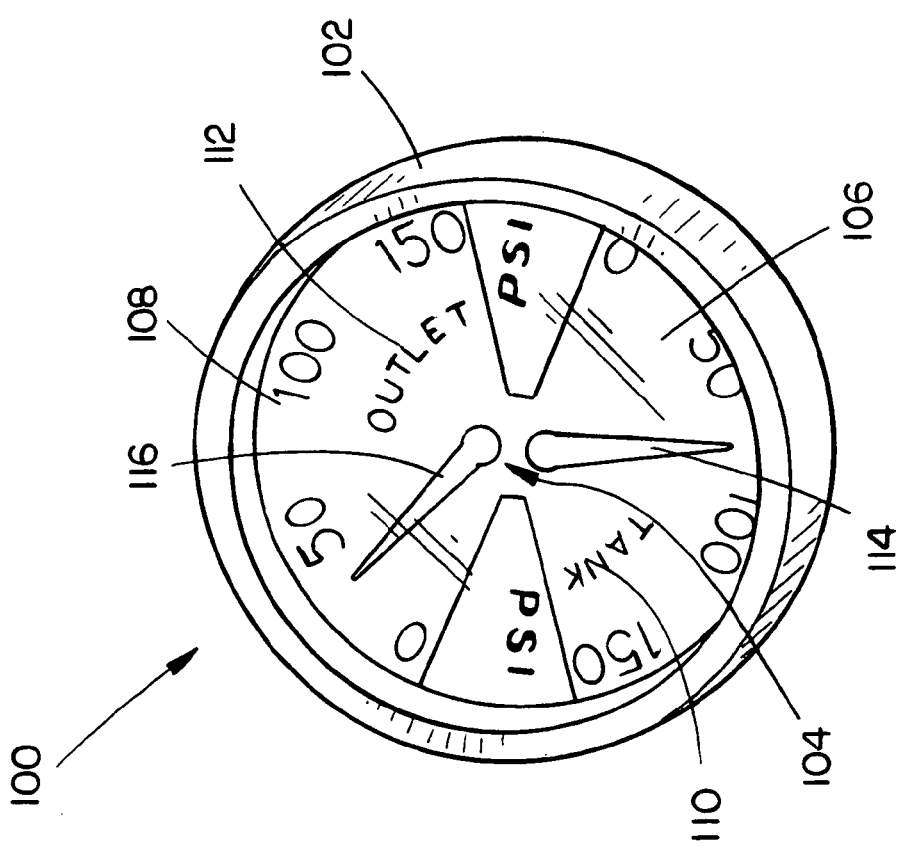
FIG. 1 is a top view of a dual gauge assembly in accordance with an exemplary embodiment of the present invention, wherein the dual gauge assembly includes two gauges enclosed by a single housing.

Referring specifically to FIG. 1, an exemplary embodiment of a dual gauge assembly 100 in accordance with the present invention is provided in which the dual gauge assembly 100 includes a single housing 102. Utilization of a single housing may make for more efficient enclosure, more efficient pressure indication (than a multiple gauge system), reduce the overall size of a pneumatic manifold, allow for a more compact compressor, simplified final assembly, and the like.

In the present embodiment, a display face 104 is disposed within the housing 102 for displaying at least two ranges. For example, a generally cylindrical housing may be selected which provides sufficient distance between markings (such as for the desired range of values to be indicated) or indication which may be printed, embossed or the like on the display face 104 of the dual gauge assembly 100. In the previous manner, the display face 104 may be partitioned into a first pressure range 106 (e.g., a zone or area of a dial) and a second pressure range 108. The first pressure range 106 corresponds to material contained within a first pressure source 110 and the second pressure range 108 corresponds to the pressure of the material contained within a second pressure source 112. In the present example, the first pressure source 110 is a tank while the second pressure source 112 is a regulated outlet.

It is contemplated that the pressure of additional compressor components such as pump head pressure, line pressure, or the like, may be monitored by the dual gauge assembly 100. Further, although the present embodiment demonstrates a dual gauge assembly enclosed within a housing, it is contemplated that gauge number may vary as required by user need. In addition, in an advantageous embodiment, a transparent cover is included which covers the display face 104 to prevent damage to various components enclosed within the housing 102, marring of the display face 104, and the like.

With continued reference to FIG. 1, the dual gauge assembly 100 includes an indicator assembly disposed within the housing 102 for indicating pressure for at least two different pressure sources whereby the indicator assembly including at least two indicators. In the present embodiment, the indicator assembly includes a first indicator 114 and a second indicator 116 which provide a visual indication of the pressure of material disposed within the first pressure source 110 and the second pressure source 112, respectively.

As illustrated in FIG. 1, the first indicator 114 and second indicator 116 each include a needle. It is contemplated that indicator size, shape, and color, as well as direction of indicator movement may vary to distinguish the source being monitored. For example, if two ranges of pressures (e.g., tank pressure and outlet pressure) are indicated it may be preferable if the indicators (i.e., needles) are configured to rotate in a single direction for such movement may assist a user in efficiently assessing the two values of pressure. In the previous embodiment, the indicators may move in a clockwise direction so that clockwise rotation of an indicator represents an increase in the relevant pressure. Those of skill in the art will appreciate that a system may be configured so the indicators travel in opposite directions with increased/decreased pressure. In the previous examples, the multiple indicators may be disposed in generally the same plane. Further, the variation in indicator color may allow a user to efficiently identify the number of indicators as well as to what source the indicator is associated. For example, the indicator for the pressure of material disposed within a regulated outlet may be blue while an indicator for the pressure of material disposed within a tank may be black. In addition, the lettering of the specific pressure sources (e.g. "OUTLET" and "TANK") may also be in corresponding colors. Such color coding allows a user to efficiently identify the two pressure sources and their corresponding values.

In further embodiments of the dual gauge assembly 100, a single pressure range may be utilized with indicators coupled to separate pressure detecting devices traveling or adjustable over the range. For example, if a single range is indicated on the display face, two indicators may adjustably position through the range or portion thereof. For example a first indicator (e.g., a pressure needle) corresponding to the outlet pressure may be mounted to a cylinder while a second indicator (e.g., a tank pressure needle) is mounted to a coaxially extending tube or cylinder. In such configuration, the first indicator is mounted in a first plane and the second indicator is mounted in a second plane different from the first. This configuration may allow for increased range of travel for the indicators such that greater delineation may be obtained between markings. For instance, it may be desirable for a commercial pneumatic device to include a gauge of the previous configuration to allow for more precise control while a device geared for an intermittent user may have a multiple range configuration.

Figure 2:
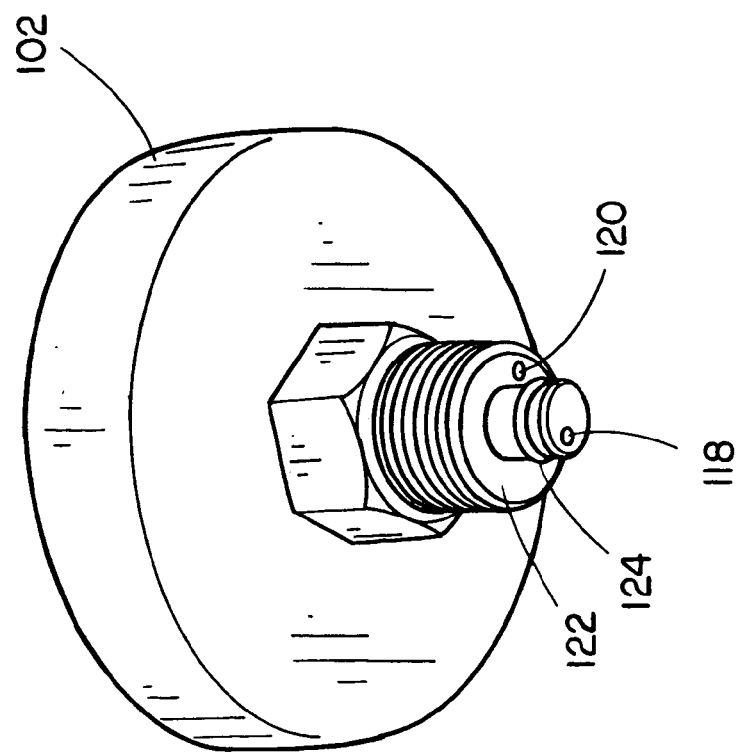
FIG. 2 is a bottom view of a dual gauge assembly in accordance with an exemplary embodiment of the present invention, wherein the dual gauge assembly includes two ports.
Figure 3:
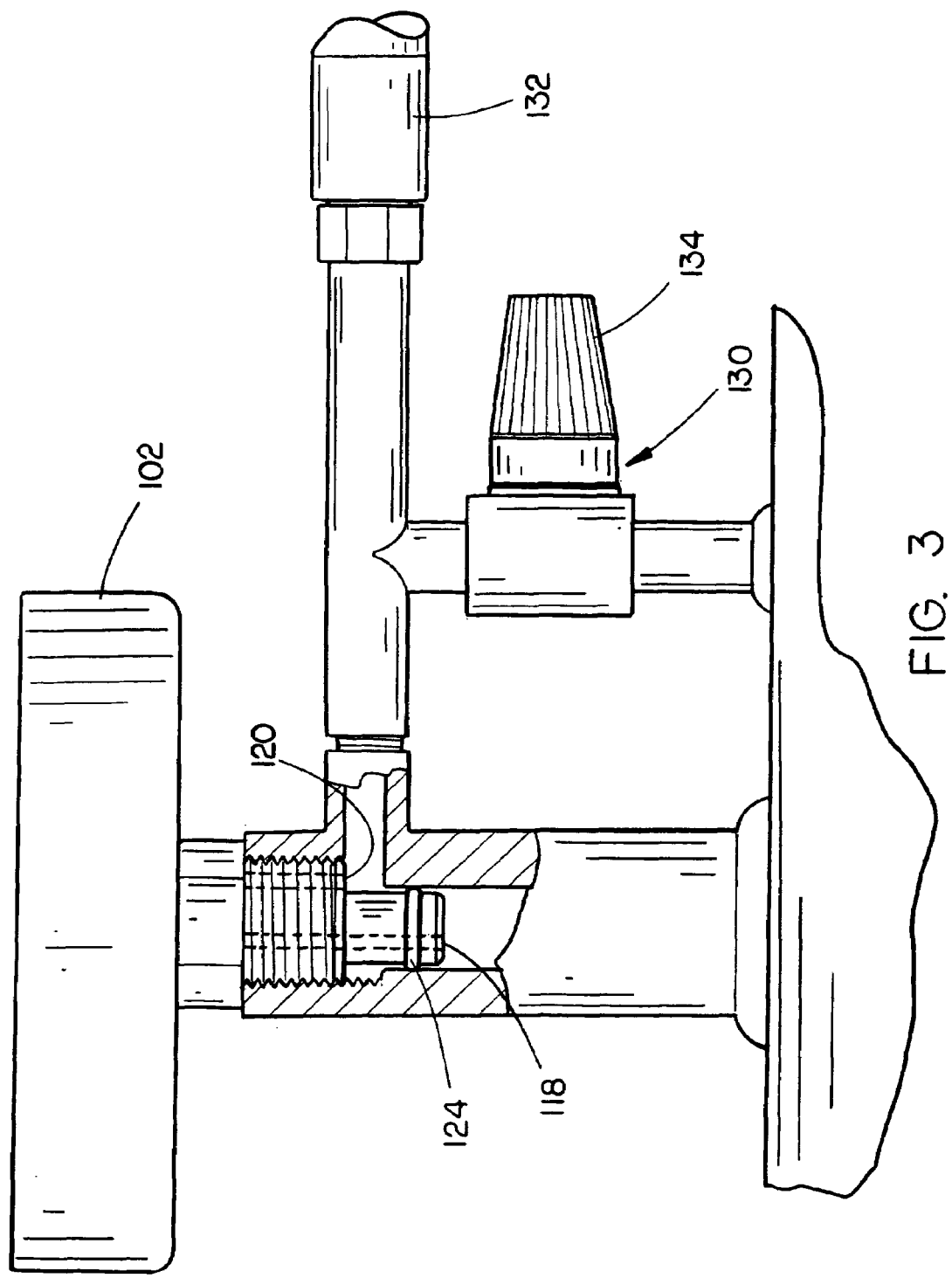
FIG. 3 is a side view of a dual gauge assembly in accordance with the present invention, wherein a cross-section of a shaft of the dual gauge assembly is provided.

In additional exemplary embodiments of the dual gauge assembly 100, the housing 102 is coupled to at least two ports for pneumatically coupling the at least two different pressure sources to the indicator assembly. In the present embodiment, as illustrated in FIGS. 2 and 3, a first port 118 and a second port 120 are disposed within a shaft 122. As such, the first port 118 supplies air to the first pressure range 106 from the first pressure source 110 and the second port 120 supplies air to the second pressure range 108 from the second pressure source 112. In an advantageous embodiment, the first port 118 and second port 120 are coaxially arranged on the shaft 122. Further, in the embodiment, the shaft 122 is threaded allowing for the dual gauge assembly 100 to be mechanically coupled with a manifold or the like disposed within a compressor 128 (as illustrated in FIG. 4).

In further exemplary embodiments, as illustrated in FIGS. 2 and 3, an O-ring 124 is disposed within the shaft 122 for allowing pneumatic isolation of the first port 118 from the second port 120. Such configuration allows pressurized material from two different sources at two potentially different pressures to be simultaneously supplied and indicated on the dual gauge assembly 100. For example, as illustrated in FIG. 3, the first pressure source 110 is a tank including air pressurized to approximately 135 psi (one hundred and thirty-five pounds per square inch). Such pressure is desirably for it allows the tank to maintain a greater amount of useful or effective air (e.g. the higher pressure allows for a greater quantity of air to be stored before the reservoir must be replenished compared to the same tank maintained at a lower pressure). The first pressure source 110 delivers air pressurized at approximately 135 psi (one hundred and thirty-five pounds per square inch) to the indicator assembly of the dual gauge assembly 100 via the first port 118. In the present example, a control valve/regulator 130 is coupled to the second port 120 and the indicator assembly of the dual gauge assembly 100 in order to regulate the pressure of the air supplied to a pneumatic tool. The regulator 130 may be set to a proper pressure for the outlet or output line (the pneumatic hose going to the pneumatic tool) by rotating a knob 134. In an advantageous embodiment, the pressure of the air supplied to the pneumatic tool is approximately 90 psi (ninety pounds per square inch). Such pressure allows fasteners to be delivered with sufficient force while not decreasing the life of the tool. The pneumatic tool is coupled to the second port 120 of the dual gauge assembly 100 via a coupler 132 such as a quick connect coupler.

Those of skill in the art will appreciate that a regulator may be included as part of the gauge as well. For example, a diaphragm regulator may be included to control the flow of gas or liquid. Further, it is to be understood that other control knobs, and the like, may be utilized without departing from the scope and spirit of the present invention. In addition, those of skill in the art will appreciate that the precise arrangement of the gauge components in the housing may be varied as desired. Example arrangements include, side by side pressure measuring device arrangement, coaxial arrangement, stacking (multiple plane arrangement for the measuring devices), and the like. In addition, various pressure measuring devices may be utilized such as a bellows gauge, a bourdon gauge, a diaphragm gauge, a strain gauge, and the like for indicating a specified pressure.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An air compressor including a dual gauge assembly, comprising:
   a pump for pressurizing air;
   a tank coupled to the pump for storing pressurized air;
   a dual gauge assembly operationally coupled with the tank and a regulated outlet for providing a visual indication of a first pressure of material disposed within the tank and a second pressure of material disposed within the regulated outlet, the dual gauge assembly including;
   a housing for encompassing the dual gauge assembly, the housing coupled to a first port and a second port;
   a display face disposed within the housing for visually displaying the first pressure of material disposed within the tank and the second pressure of material disposed within the regulated outlet;
   a first indicator disposed within the Single housing operable for providing a visual indication of the pressure of material disposed within the first pressure source; and
   a second indicator disposed within the single housing operable for providing a visual indication of the pressure of material disposed within the second pressure source,
   wherein the first and second indicators of the dual gauge assembly provide a simultaneous visual indication of the first pressure of the material disposed within the tank and the second pressure of the material disposed within the regulated outlet.

2. The air compressor of claim 1, wherein the first and second ports are coaxial.

3. The dual gauge assembly of claim 1, further comprising an O-ring configured for pneumatically isolating the first port from the second port.

4. The dual gauge assembly of claim 1, wherein the first port and second port are disposed within a threaded shaft.

5. The dual gauge assembly of claim 1, wherein the first and second indicators rotate in a single direction.

6. An air compressor assembly operable for providing pressurized air to a tool, the air compressor assembly comprising:
   a pump for producing pressurized air at a first pressure;
   an air tank fluidly connected to the pump for storing the pressurized air at the first pressure;
   a high pressure pipe fluidly connected to one of the pump and the air tank;
   a pressure regulating valve including an inlet, fluidly connected to the high pressure pipe, and an outlet, the pressure regulating valve reducing the pressurized air from the first pressure at the inlet to a lower second pressure at the outlet;
   a low pressure pipe fluidly connected to the outlet of the pressure regulating valve;
   a dual gage assembly including a single gage face, a first a pressure indicator and a second pressure indicator, the first pressure indicator fluidly connected to the high pressure pipe for displaying the first pressure and the second pressure indicator fluidly connected to the low pressure pipe for displaying the second pressure.

7. An air compressor assembly according to claim 6, wherein the first pressure indicator and the second pressure indicator provide a simultaneous visual indication of the first pressure and the second pressure.

8. An air compressor assembly according to claim 6 and further including a housing encompassing the dual gauge assembly.

9. An air compressor assembly according to claim 6 wherein the first pressure indicator includes a first air port, and the second pressure indicator includes a second air port.

10. An air compressor assembly according to claim 9, wherein the first and second ports are coaxial.

11. An air compressor assembly according to claim 10, further comprising an O-ring configured for pneumatically isolating the first port from the second port.

12. An air compressor assembly according to claim 9, wherein the first port and second port are coaxially disposed within a threaded shaft.

13. An air compressor assembly according to claim 6, wherein the first pressure indicator and the second pressure indicator rotate in the same direction.

* * * * *